Sept. 20, 1932.   H. S. ARNOLD ET AL   1,878,573
ELECTRICAL DISTRIBUTION
Filed March 3, 1926   3 Sheets-Sheet 1

INVENTORS
Harry S. Arnold
Ray C. Wilson
BY
Philip S. McLean
ATTORNEY

Sept. 20, 1932.  H. S. ARNOLD ET AL  1,878,573
ELECTRICAL DISTRIBUTION
Filed March 3, 1926  3 Sheets-Sheet 2

INVENTORS
Harry S. Arnold
Ray C. Wilson
BY Philip S. McLean
ATTORNEY

Sept. 20, 1932.   H. S. ARNOLD ET AL   1,878,573
ELECTRICAL DISTRIBUTION
Filed March 3, 1926   3 Sheets-Sheet 3
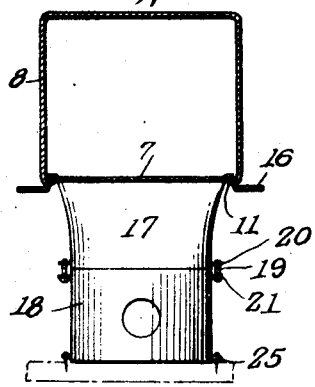
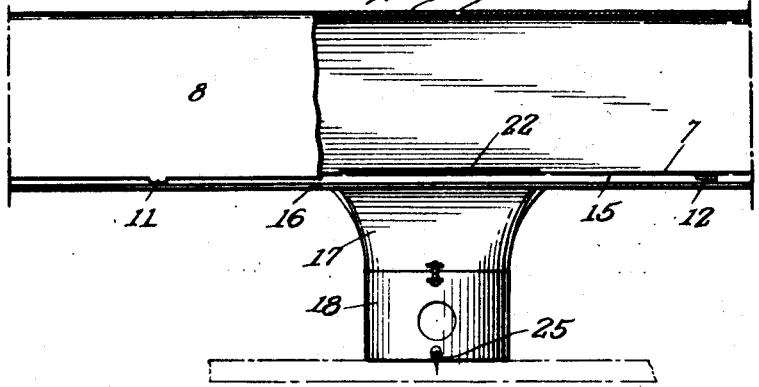
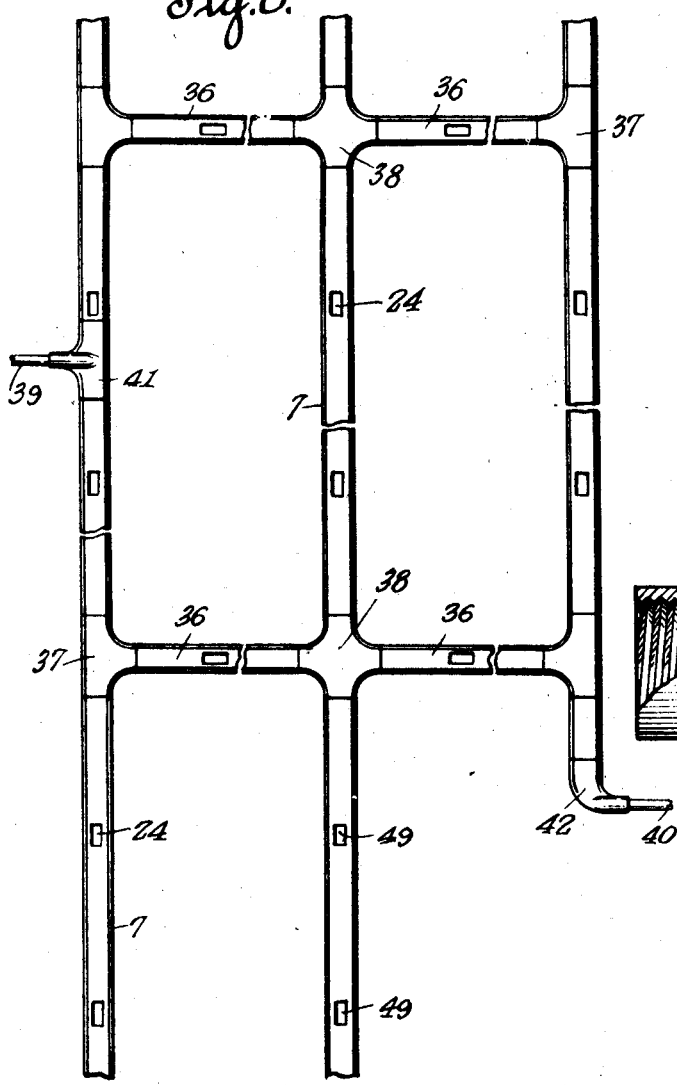
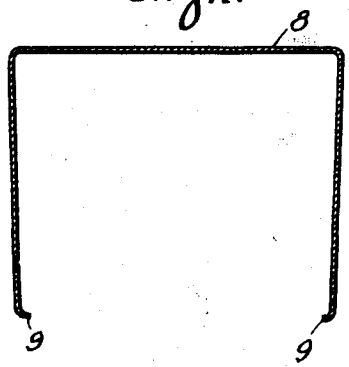
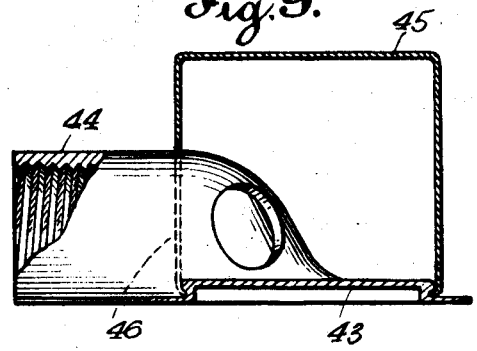
INVENTORS
Harry S. Arnold
Ray C. Wilson
BY
Philip S. McLean
ATTORNEY Patented Sept. 20, 1932

1,878,573

UNITED STATES PATENT OFFICE

HARRY S. ARNOLD, OF BROOKLYN, AND RAY C. WILSON, OF NEW YORK, N. Y.

ELECTRICAL DISTRIBUTION

Application filed March 3, 1926. Serial No. 91,883.

This invention relates to the distribution of the electric wiring in office buildings, loft buildings and similar structures.

Some of the main requisites in this class of work are low cost of installation, non-interference with other structural work and adaptability or so-called flexibility to meet the varying requirements of different tenants.

In two prior Patents #1,480,587 and 1,515,324 we have disclosed how these needs are met to a large extent by a system of wire receiving raceways embedded in the ceiling slabs of the building structure and having outlets to the ceiling at predetermined intervals with the possibility of other subsequently formed outlets between the fixedly originally installed outlets. The systems covered by these patents are adequate to all building requirements thus far encountered but the complete utilization of the system involves the cutting through the ceiling slab into the raceways at various selected points between the initially installed spaced outlets. Special skill is required in locating and cutting through these extra outlets and a certain amount of refinishing is sometimes necessary to hide breaks or injuries to the structure, resulting from the cutting through the slab into the raceway.

Some of the more important objects of the present invention are to make provision in the original installation for all outlets that may be later required, in a form such that they may be immediately utilized and to accomplish this in a relatively inexpensive structure which will be practical and desirable in every way.

The foregoing and other objects are attained by certain novel features of construction, combinations and relations of parts as hereinafter set forth and broadly claimed.

The drawings accompanying and forming part of this specification illustrate practical embodiments of the invention but in view of the fact that these drawings are primarily for purposes of disclosure, it should be understood that the structure may be modified in various respects without departure from the true spirit and scope of the invention.

Figures 5 and 6 are cross sectional and broken longitudinal sectional views respectively of a modified form of interlock between the base and cover strips of the raceway.

Figure 7 is a cross sectional view of the cap or hollow cover of the raceway illustrating particularly the way the sides are sprung together so as to snap into interlocking engagement with the base strip.

Figure 8 is a broken outline plan view illustrating a series of cross connected raceways and the combination fittings receiving the conduit of the current supply mains.

Figure 9 is a part sectional view of the base part of one of the combination raceway and conduit fittings.

Figure 1:
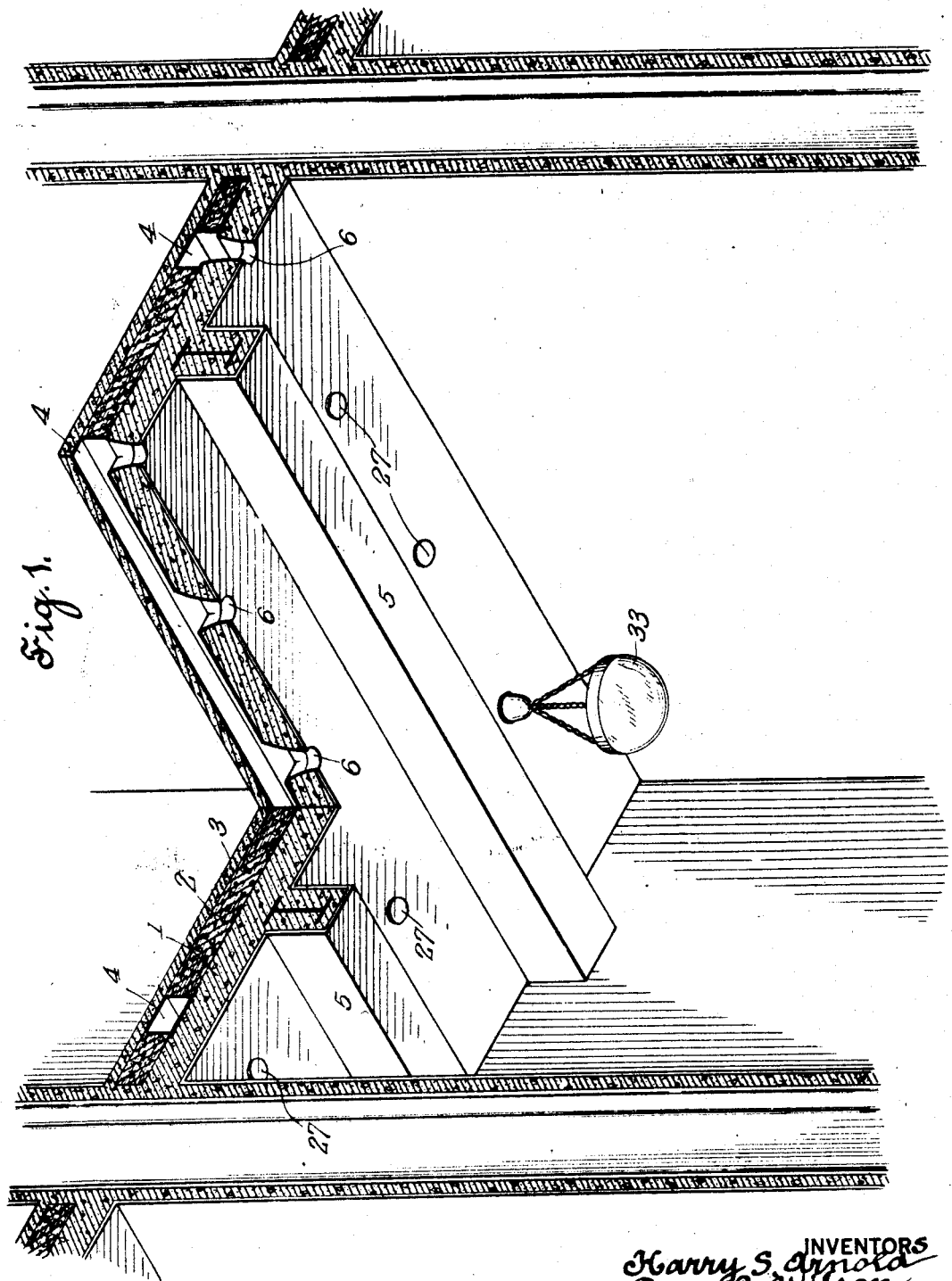
Figure 1 is a sectional perspective view of a typical installation in a combined ceiling and floor slab.

In the building structure illustrated in Figure 1, the combination ceiling and floor slab is indicated at 1, the so-called filler at 2 and the floor surface at 3. In this view, three of the wire raceways are indicated at 4, disposed in spaced parallel relation between the beams 5 and having downwardly extending outlet fittings 6 disposed in relatively closely spaced relation and opening down to the ceiling level of the slab.

Figure 2:
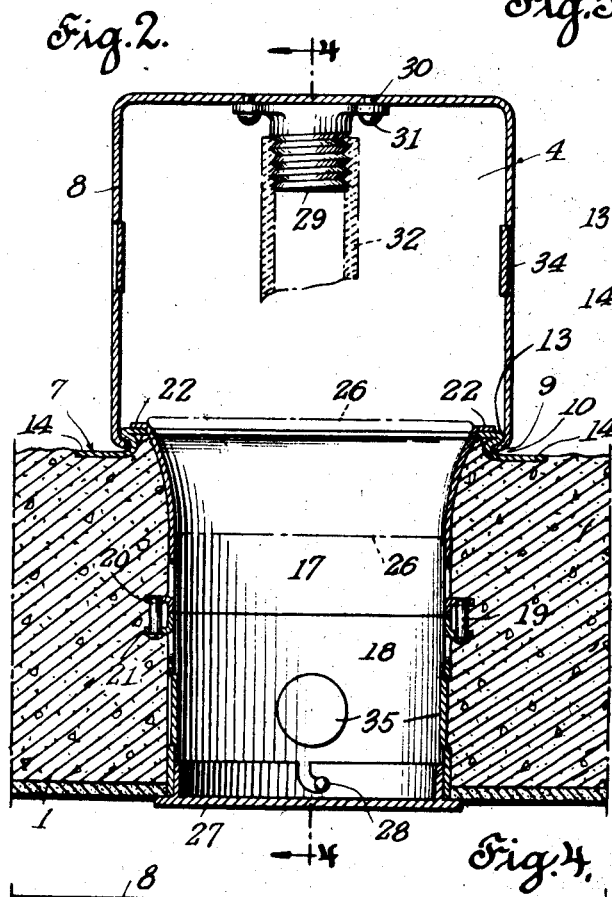
Figure 2 is an enlarged cross sectional view of the raceway and one of the outlet fittings as embedded in the body of the slab and before the floor fill is completed.
Figure 3:
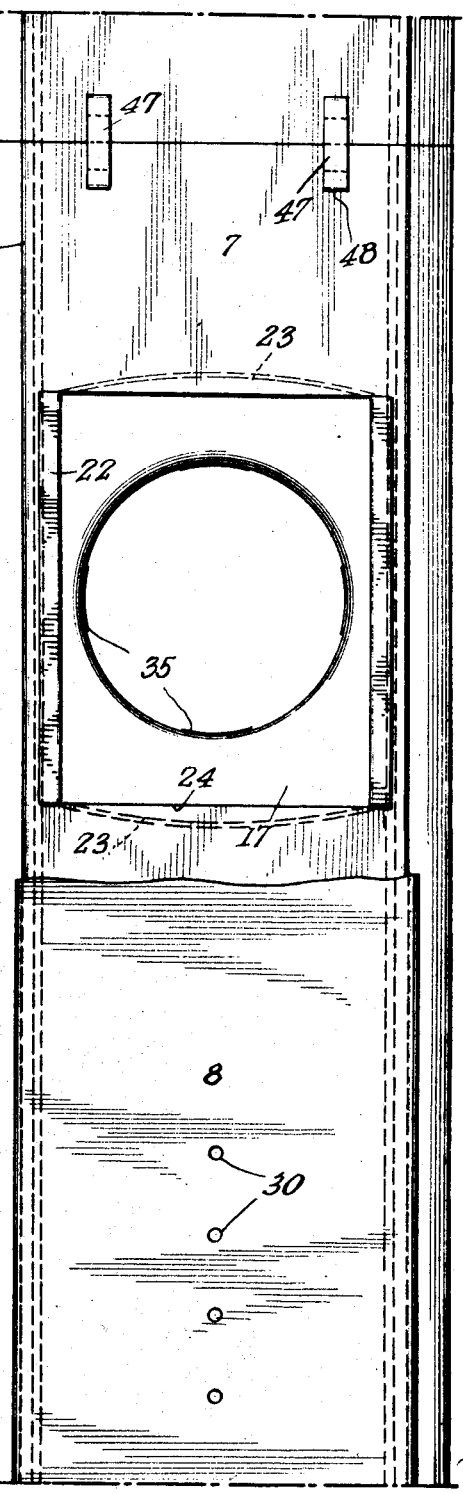
Figure 3 is a top plan of the same parts with the top or cover of the raceway broken away to show the outlet fitting.
Figure 4:
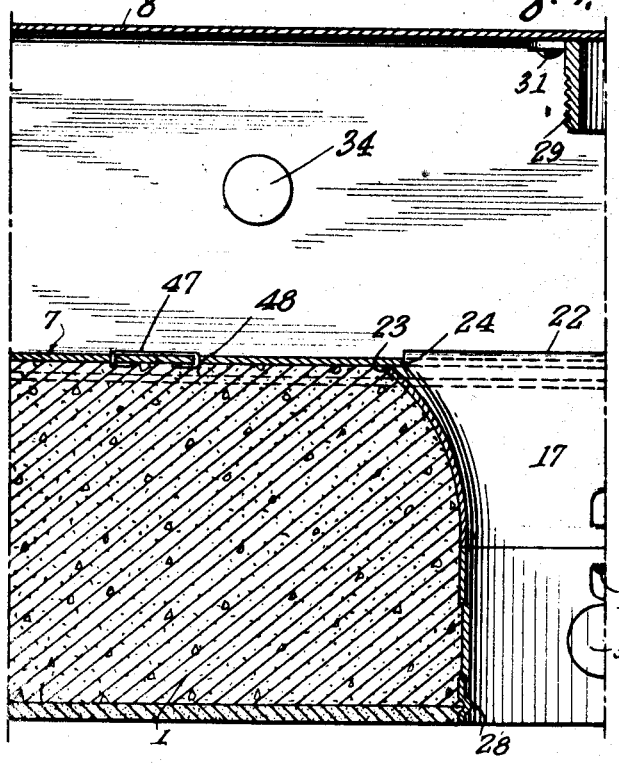
Figure 4 is a longitudinal sectional view as taken on substantially the plane of line 4—4 of Figure 2.

Figures 2, 3 and 4 illustrate a preferred method of constructing the raceways and outlet fittings. In these views 7 designates a base strip designed to rest on the body of the slab and forming a positioning and supporting member for the outlet fittings and a bottom for the wire raceway.

The top or cover for the raceway is designated 8 and is shown as of inverted trough shape with substantially rectangularly related top and dependent sides so as to form when engaged with the base strip, a substantially rectangular raceway of ample size to receive the wires for a plurality of circuits and of substantially unobstructed interior so as to enable the wires to be readily "fished" into and through the same.

A suitable form of interlock is preferably provided between the base strip and cover. In the structures illustrated this interlock is afforded by inturned lips or flanges 9 along the lower edges of the cover engaging in outwardly facing grooves 10 in the edge portions of the base strip.

Ordinarily the engagement of these flanges in the grooves is sufficient but if a more secure fastening is desired, the cover may be formed with lugs or tangs on its lower edges, as shown at 11 in Figures 5 and 6, to enter slots 12 in the edge portions of the base. These lugs are shown as turned inwardly lock the flanges 9 and the cover in this case also may be formed as indicated in Figure 7 with the sides sprung inwardly so that the cover will snap into engagement with the base and hold there with spring tension.

The grooves in the base may be formed as shown in Figure 2 by rolling inward the metal of the same near the opposite side edges. This leaves the central or body portion of the strip with doubled reinforced edges 13 and with depressed side strips 14 forming shoulders bearing on the slab. Substantially the same effect is produced in Figures 5 and 6, where the edge portions of the base are flanged downwardly at 15 to receive the perforations 12 and thence outwardly to provide the supporting edge strips or shoulders 16. In both cases it will be seen that the base member has depressed supporting shoulders or edge strips, a raised central portion to form the bottom of the raceway and upstanding flanges connecting the edge and central portions and provided with seats receiving the inturned flanges or lugs on the cover. This structure reinforces and strengthens the base strip, enabling the use of a relatively light sheet metal and locates the interlocking recesses so that they will not likely be clogged with the concrete and so that they can be readily cleared, if that is necessary.

The ceiling outlets are spaced closely enough to answer not only the usual or average requirements, but also such unusual or special requirements as various tenants may demand. For such purposes, a spacing of from twelve to twenty-four inches between centers is sufficient, being decided ordinarily by the character of the structure and the known or probable needs of the tenants who will occupy it. The illustration, Figures 1 and 8, indicate a spacing of the ceiling outlets approximately twenty-four inches between centers.

The outlet boxes or fittings are illustrated as a general funnel shape and as made in upper and lower sections 17, 18, connected in abutting relation by screws 19 engaged with screw lugs 20, 21 struck out from the respective sections. This two part structure is desirable, allowing as it does for the manufacture of the upper section of a uniform depth and the lower section of different standard lengths to suit ceiling slabs of different thickness. The lower section may be cylindrical in shape, as shown, as the upper section be rectangular at the top and tapered down by its funnel shape to the cylindrical outline of the lower section.

The outlet fittings may be secured to the base strip in various ways in the illustration, the side edges of the upper sections of the fittings are flanged outwardly at 22 to rest on top of the edge portions of the base strip and the end edges 23 of the section are cut down and bowed outwardly, as indicated in Figures 3 and 4, so that they can be snapped under the lower face of the base strip. The openings 24 in the base strip to receive the outer fittings are therefore substantially rectangular and of such length and width that the fittings can be forced down therethrough until the outwardly bowed ends snap beneath the strip and the edge flanges rest on top of the strip, under which conditions the fittings become firmly positioned and interlocked with the base strip.

A special advantage of the method of connection described is that the base strips may be shipped flat and the outlet fittings be inserted just before installation. This method of assembly also enables the blanking off at any points where outlets would be unnecessary or in the way by simply covering any of such openings 24 by a flat plate or the like prior to the pouring of the slab. With ordinary care in pouring such covers actually may not be needed as the only point is to prevent the concrete of the slab from rising through openings 24 in the base to such an extent as might interfere with the future drawing of the wires through the raceway.

The outlet boxes or fittings extend through the body of the ceiling slab and therefore are of a height substantially equal to the thickness of the slab. The fittings may be formed in one piece in heights equal to the thickness of ceiling slabs or combination ceiling and floor slabs ordinarily used, but the two-piece form of fitting shown has the advantage that the upper funnel shaped sections may be made all in one height and the lower sections be made in different heights and be used, according to their heights, with the upper sections to suit different thicknesses of slab.

The outlets are positioned on the wooden or other forms for the slabs on eighteen inch centers or other spacing decided upon and may be held in place during the pouring of the slab by nailing them on the forms, for instance, with fastenings inserted through nailing lugs such as indicated at 25, Figure 6. The slab is poured to the level of the tops of the boxes and to prevent concrete from entering the boxes, temporary plugs of wood or the like may be inserted in the funnel tops of the boxes, as indicated at 26 in Figure 2.

After the slab has hardened and before the fill is applied, the raceways are completed so that in the final structure such as shown in Figure 1, there are embedded in the slab, the continuous raceways adapted to receive any desired number of circuit wires and lines of closely spaced finished outlets opening downwardly from said raceways to the ceiling level. These outlets are of a character to permit extra lines of wiring to be fished into or from the raceways wherever required, on the centers decided upon. Until used, these outlets may be closed by caps 27 which, as shown in Figure 2, may simply be telescoped partly up into the outlets and temporarily secured by fastenings such as the bayonet joints 28. Whenever one of the outlets is to be utilized, this cap or closure is removed so as to give access to the full interior of the raceway. The wires may be easily drawn out or pushed back into the raceway for wiring purposes and if a lighting fixture or the like is to be located at the outlet, this may be done by supporting the same from a fixture stud 29 secured to the top of the raceway.

If desired, the raceway may be provided at desired intervals with tapped openings 30 to receive screws 31 for securing such fixture supports in place. This enables the fixture studs to be entered and fastened in place up through the outlet box after the installation has otherwise been completed. The pipe for supporting the fixture is indicated in broken lines at 32 in Figure 2 and the lighting fixture supported from such pipe is shown at 33 in Figure 1.

The raceway made up of base strip and attached hollow cover has many advantages over the method of simply securing the outlet fittings at predetermined close centers on the form and then securing a raceway in position over and in communication with the same. The base strip provides in the first place a means for definitely spacing the outlets on the desired centers and in addition to providing a smooth floor for the raceway, adds a certain amount of reinforcement to the completed slab. The provision of the locking seats in the sides of the base strip prevents an accumulation of concrete about such seats and this location, together with the outstanding edge strips 14, enables any concrete that may adhere, to be readily scraped out with a screwdriver or other similar tool. When all is ready for the fill to be applied to the slab, the covers are snapped into place over the base strips, automatically interlocking therewith to form completed raceways over which the fill and floor surface may be applied without fear of disturbing such raceways. The laterally extending edge strips 14 and 16 also serve as bearings supporting the cover and if desired, may be shaped so as to overcome any tendency of the cover to spread or lose its hold upon the base.

In order that rigid conduit may be connected in with the raceways or the outlet fittings, if such be desirable, the raceways may be provided in the sides or top with suitable knockouts 34 and similarly, the outlet fittings may have knockouts 35 in the sides of the same.

In Figure 8 a typical installation for a combined ceiling and floor slab is shown with a plurality of the parallel raceways connected at intervals by cross over sections 36 similar in construction to the raceway and outlets described. This arrangement enables the installation of a bridge work of wiring sufficient to meet practically any requirements where the cross overs or transverse runs join the longitudinal raceways, the T-fittings 37 and cross fittings 38 may be employed and the feed wires may be entered into the system by way of rigid conduit 39 or be extended to some other location by rigid conduit 40, special T- and L-fittings 41 and 42 being provided at such points. These latter fittings may be constructed as indicated in Figure 9 with base parts 43, meshing the base strips of the raceways having threaded necks 44 to receive the rigid conduit and constructed to have special cover sections 45 interlocked therewith, which sections are cut out as indicated at 46 to fit over the conduit receiving necks 44.

The open continuous character of both the longitudinal and transverse or cross connecting raceways enables the drawing of practically any number of circuit wires that may be required and the full utilization of such wiring from practically any point or points in the ceiling. The raceway is of such a nature also that if in addition to the ceiling outlets, outlets to the floor above are required, such floor outlets may be provided in conjunction with the ceiling outlets after the manner disclosed and covered in our Patent #1,515,324. The flexibility of the system is thus a maximum and, as the outlet fittings are relatively inexpensive, such flexibility is obtained at a minimum cost.

The base strips may be suitably tied together when they are first laid as by means of staple-like connectors 47 Figures 3 and 4 in the form of flat strips having downturned ends adapted to enter in openings 48 provided near the abutting ends of the base strips.

Instead of using fixture studs such as shown in Figure 2 the fixtures may be supported by means of toggle hangers passed up through the outlets and expanded so as to be supported by the upper ends of the fixture outlets or the base strip.

The outlet fittings may be of different diameters in accordance with different wiring requirements. Correspondingly, the openings in the base strip to receive such fittings may be of different sizes or shapes.

The openings or seats in the base strip for the outlet fittings may be formed as knockouts which can be left in place where no outlets are to be provided or quickly punched out where fittings are to be inserted. Some of these knockouts which have been left in place are shown at 49 in Figure 8.

What is claimed is:

1. A raceway for electrical wiring comprising a base strip having outstanding marginal flanges for resting on a slab structure, a raised central portion forming the bottom of the raceway and connecting side portions between the marginal flanges and raised bottom portion, said connecting side portions having outwardly faced seats and an inverted trough shaped cover having dependent inwardly projecting lugs on the side edges of the same for interlocking engagement with the side seats.

2. In apparatus of the character disclosed, a wire raceway comprising a base strip having knockouts at closely spaced intervals, outlet fittings adapted to be seated in the openings left by removal of selected knockouts from the base strip and a hollow cover engageable with the base strip over the knockouts and over the applied outlet fittings.

3. A wire raceway for embedding in concrete floor slabs, comprising a substantially flat base strip having openings therein, outlet fittings seated in said openings and dependent from said flat base strip, said fittings having ceiling outlet portions at their lower ends and flaring upwardly toward their upper ends to substantially the full width of the flat base strip and an inverted trough-like cover extending continuously over the flat base strip and over the outlet fittings dependent from said flat base strip and having its edges secured to the edge portions of the base strip.

4. A wire raceway for concrete floor slabs and the like, comprising a substantially flat base strip having knockouts of substantially the full width thereof located at predetermined intervals, outlet fixtures having flaring upper ends of substantially the full width of the base strip engageable in openings in the base strip left by removal of said knockouts and an inverted trough-like cover engageable over said base strip.

5. In a wire raceway, a substantially flat base strip having substantially rectangular openings therein and outlet fittings having flaring end portions to fit in said openings, the side walls of said flaring end portions having supporting lugs to rest on top of the base strip and portions sprung to snap into interlocking engagement beneath the base strip.

6. A wire raceway for concrete floor slabs and the like comprising a substantially flat base strip, ceiling outlet fittings carried thereby and dependent therefrom, an inverted hollow trough-like cover overstanding and engaged with the edge portions of said flat base strip and fixture supports secured to the top of the inverted trough-like cover in line with and above said ceiling outlet fittings.

7. A wire raceway for concrete floors or the like comprising a base strip substantially flat and having exposed seats in the edge portions thereof, outlet fittings dependent from the intermediate portion of said base strip between said seats and an arched cover having lugs at the edges thereof for interlocking engagement with the seats aforesaid.

8. A wire raceway for concrete floors or the like, comprising a substantially flat and continuous base strip having knock-outs along the central portion of the same, ceiling outlets having interlocking engagement in the openings provided by removal of said knock-outs and an inverted trough-like cover having interlocking engagement with opposite edges of the flat base strip and extending continuously over said flat base strip and over the open tops of the outlet fittings interlocked in the knock-out portions of said base strip.

9. A wire raceway for concrete floors or the like, comprising a substantially flat and continuous base strip to be supported on a concrete floor slab, said strip having openings therein, ceiling outlets having interlocking engagement with said openings in the substantially flat base strip and an inverted trough-like cover having interlocking engagement with the edges of said substantially flat base strip and extending continuously over the same and over the open tops of the outlet fittings interlocked in the openings of said base strip.

10. A wire raceway for concrete floors or the like, comprising a base strip to lie flat over a concrete floor slab, an arched cover coextensive with said base strip and engaging along its edges with the side edge portions of the base strip, said meeting edges of the cover and base strip having portions interlocking to secure the cover to the base strip as the complemental portions of a wire raceway and ceiling outlets dependent from the base strip between the side edges of the same and covered by the arched cover.

11. A wire raceway for concrete floors or the like, comprising a base strip to lie flat over a concrete floor slab, an arched cover coextensive with said base strip and engaging along its edges with the side edge portions of the base strip, said meeting edges of the cover and base strip having portions interlocking to secure the cover to the base strip as the complemental portions of a wire raceway and ceiling outlets dependent from the base strip between the side edges of the same and covered by the arched cover, the interlocking means between the base strip and cover including outwardly faced seats in the edge portions of the base strip and inturned lugs on the lower edges of the cover engaging in said outwardly facing seats.

12. A wire raceway for concrete floors or the like, comprising a base strip to lie flat over a concrete floor slab, an arched cover coextensive with said base strip and engaging along its edges with the side edge portions of the base strip, said meeting edges of the cover and base strip having portions interlocking to secure the cover to the base strip as the complemental portions of a wire raceway and ceiling outlets dependent from the base strip between the side edges of the same and covered by the arched cover, the base strip having a central raised portion from which the ceiling outlets are suspended and having depressed side shoulders below said central raised portion, said side shoulders carrying portions of the interlocking means for securing the cover over the base strip.

In witness whereof, we have hereunto set our hands, this 1st day of March, 1926.

HARRY S. ARNOLD.
RAY C. WILSON.